Sept. 9, 1958  T. B. WAYNE ET AL  2,851,428
PROCESS FOR REVIVIFYING CARBONACEOUS ADSORBENTS
Filed March 8, 1956  3 Sheets—Sheet 3

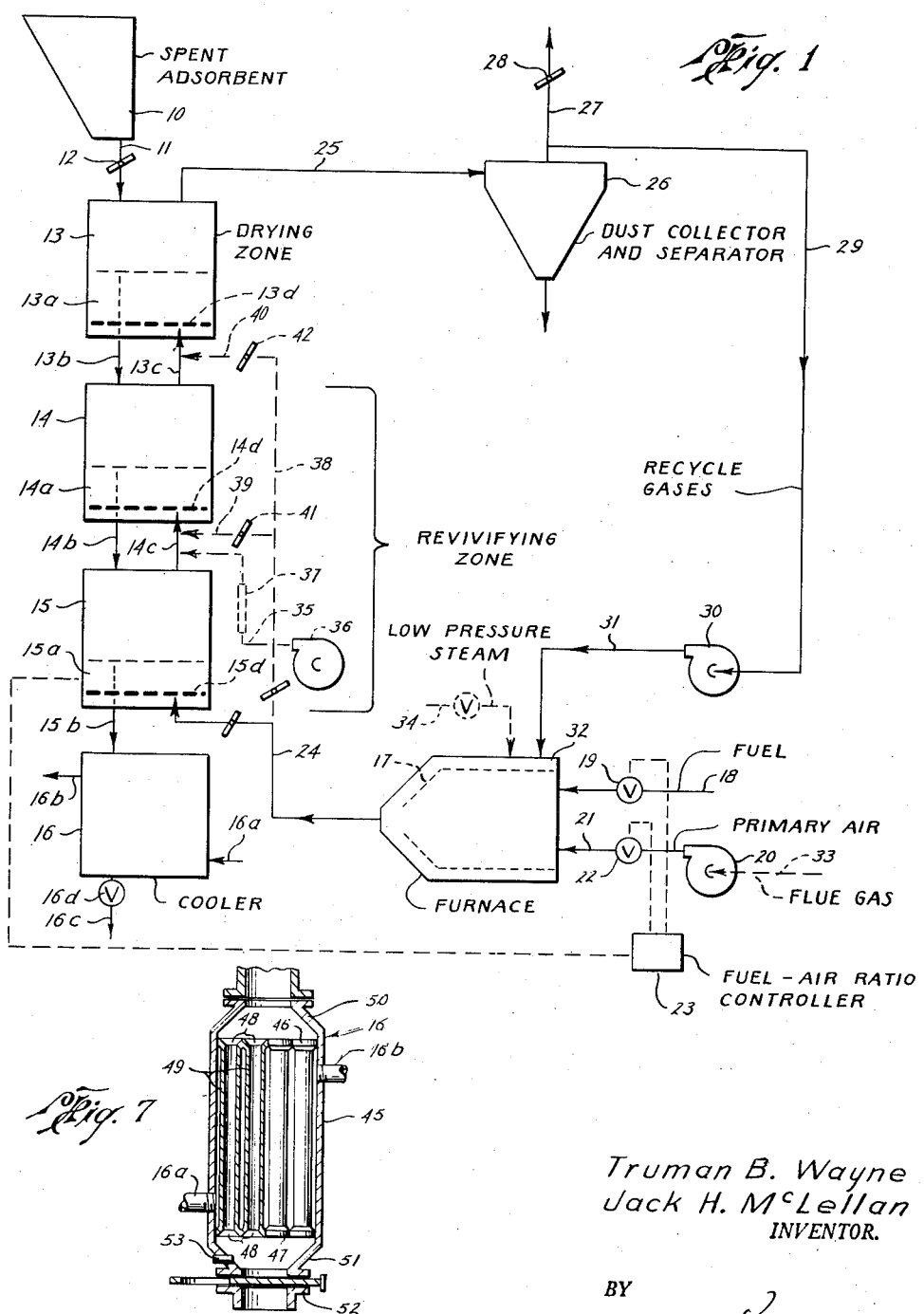

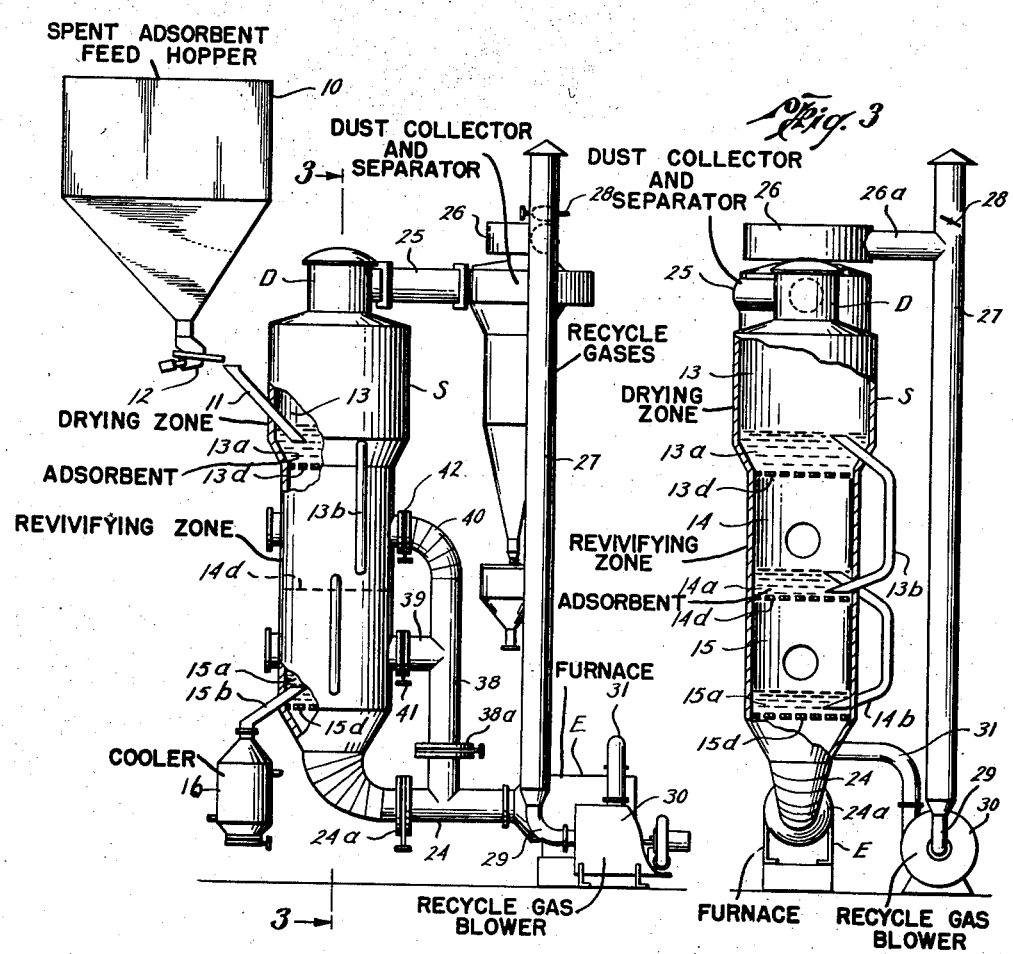

Truman B. Wayne
Jack H. McLellan
INVENTOR.

BY

ATTORNEY

United States Patent Office 2,851,428
Patented Sept. 9, 1958

2,851,428

PROCESS FOR REVIVIFYING CARBONACEOUS ADSORBENTS

Truman B. Wayne, Houston, Tex., and Jack H. McLellan, Garden City, N. Y.

Application March 8, 1956, Serial No. 570,385

10 Claims. (Cl. 252—417)

This invention relates to a process of revivifying carbonaceous adsorbents. This application is a continuation-in-part of application Serial No. 227,968, filed May 24, 1951, now abandoned.

The present invention relates particularly to the revivifying of carbonaceous, granular adsorbents such as bone char, synthetic bone char substituents such as the "Synthad" of commerce which is a synthetic material corresponding structurally and functionally to bone char, being composed of a permeable mineral skeleton of basic calcium phosphate on which is deposited from about 3 to about 12 percent by weight of activated carbon, and other granular adsorptive carbonaceous materials which are used in the purification of aqueous solutions, more particularly of the character produced in the making of sugar from cane, beet and corn containing coloring matter, mineral salts, and other undesirable impurities in association with sucrose, dextrose, levulose, maltose, soluble dextrins, or other soluble materials which it is desirable to have in purified form.

In the art of treating solutions of the character described, the adsorbent or char is placed in a bed and the solutions are percolated therethrough. The adsorbent is therefore of coarse granular structure, that is, of a mesh to effect or permit such percolation, viz., 10–80 mesh; that is, to pass through a 10 mesh and retained on an 80 mesh Tyler screen. A process of revivification of the adsorbent must therefore be such as to substantially retain such coarse mesh, so as to again effect or permit percolation of the solution through a bed of the adsorbent.

The deposits on the adsorbent or char resulting from such treatment of such solutions, may be generally described as follows: They are carbohydrates and related substances which are not deposited as permanent carbon, but the carbon atoms are still in a molecular structure with hydrogen, oxygen and other elements, and they are generally organic substances such as gums, proteins and carbohydrates. The deposited substances are generally adsorbed from a water solution at below 200° F. and have not been subjected to pyrolytic action and as the result of high temperature reactions so that the deposits must be burned off under severe oxidization conditions. The deposited substances are, therefore, readily removed by mild selective oxidization and are capable of oxidizing completely without leaving a substantial permanent carbon residue and when removing little or none of the permanent surface-active carbon on the adsorbent or char.

One of the objects of the invention is to provide an improved process or method for oxidizing carbonaceous matter removed from the impure solutions by the adsorbents and held on the char surfaces, and reactivating these char surfaces so that they may be again used for purification purposes. The term "char surfaces" as used herein is intended to include all active surface area of the granular adsorbent, inclusive of the surface area within the minute pores of the char.

Another object is the provision of an improved process for selectively removing from the surfaces of such a carbonaceous adsorbent, organic matter of the character described which has been deposited thereon, and in an effective manner.

Another object is to provide a process by which spent carbonaceous adsorbents may be dried and revivified continuously under closely controlled regenerating conditions so as to effect substantially complete oxidization of the impurities on the adsorbent but so as not to effect any substantial oxidization of the permanent surface-active carbon of the adsorbent.

Another object of this invention is to revivify the coarse spent adsorbent while in a fluidized state by passing therethrough heated oxidizing gases, but in such a manner that the coarse character of the adsorbent is maintained.

Another object is to so treat the spent adsorbent after revivification as to prevent burning of the adsorbent discharged from the revivification step.

Other objects of this invention are to obtain improvements over conventional processes which will result in more highly reactivated adsorbents from the regeneration cycle, more selective oxidization of the adsorbed impurities, avoidance of deposits of graphitic, non-activated carbon within the char pore areas, better control of the pH values of effluents from the purification operation, and various other advantages over existing methods which will become apparent hereinafter.

In the preparation of refined sugars, corn syrups, and similar carbohydrate products it has long been the practice to decolorize and purify them in aqueous solutions by employment of activated carbons of either animal or vegetable origin. Bone char, prepared by carbonizing bones in a retort in the presence of insufficient air to oxidize the carbon formed during the pyrolytic decomposition of the organic matter within the bones, is widely used. Vegetable chars, prepared by a similar charring of materials of vegetable origin, are also used.

The granular adsorbents such as bone char, Synthad, and certain vegetable chars prepared in granular form are generally used in percolation processes wherein the adsorbent is placed in large cisterns and the impure solutions are percolated by gravity or under pressure, or in some cases are forced upward, through the adsorbent bed to effect purification of the solutions. Adsorbents comprising this class are, as noted above, of relatively coarse granular form in order to facilitate percolation of the solutions through the char bed, and also to facilitate removal of sugar and soluble impurities in the washing ("sweetening off") operation. It is, therefore, the usual practice to screen off and discard particles of sizes which will pass through a 100 mesh screen.

The granular, carbonaceous adsorbents to be revivified in accordance with this invention may be those sufficiently porous in structure and of particle sizes which readily lend themselves to percolation filtration methods. Generally speaking, the process of this invention will be applicable to relatively coarse carbonaceous adsorbents, viz., particles which will pass through a standard (Tyler) 10-mesh classifying screen but which will remain on an 80 mesh screen.

The granular, carbonaceous adsorbents suitable for regeneration in the present process may be divided into two general classes: (1) materials such as bone char, synthetic bone char (Synthad) and others comprising a permeable mineral skeleton or structure, such, for example, as basic calcium phosphate, on which is deposited activated carbon in relatively lower proportions than in the second class, (2) wherein the carbonaceous adsorbent particles consist mainly of carbon, some of which is active and the remainder comprises a binder or structure of permeable character which holds the active carbon particles. A variation of the latter class would be pellets or particles of active adsorbent wherein some type of heat and oxidization resisting binder or structure is used to support the active carbon particles. In some instances this would be a coke-like material derived from bituminous coal or other substances which would provide the necessary physical structure and also the necessary proportion of surface-active carbon.

Regardless, however, of the source or origin of the carbonaceous adsorbent, if it contains surface-active carbon capable of adsorbing impurities from solution, is coarsely granular in character, and is capable of revivification by heat treatment, it will respond to the fluidized revivification process herein described and yield a revivified adsorbent of superior qualities.

Fluidization may be defined as that unit operation in which a mass of solid particles, in this case, of coarse granular structure in a loose bed, is maintained by means of an upwardly moving gas stream in a turbulent dense state, thus decreasing the bulk density of the bed and expanding the depth thereof. Under conditions of fluidization, the position of the bed of solids remains unchanged, with the upper surface resembling that of a boiling liquid. In accordance with this invention, however, while the velocity of the gases is sufficient to effect fluidization of the bed of the granular adsorbent, the velocity is insufficient to carry any material part of the granular adsorbent out of the bed.

Where the adsorbent has been employed in the treatment of aqueous solutions, the spent adsorbent is wet, that is, it contains water. In accordance with an illustrative embodiment of this invention, a bed of such adsorbent is dried by passing heated gases through the bed at a velocity sufficient to effect fluidization thereof and at a temperature sufficient to volatilize the water or other volatile matter. During such drying operation the gases need not contain any oxidizing components but may be inert and the temperature of the gases need not be above that sufficient to volatilize the water or other volatile matter.

In the revivification of the spent adsorbent to oxidize the matter adsorbed thereon, heated gases are passed through a bed of the adsorbent to effect fluidization thereof. Here the temperature of the gases and the proportions of the oxidizing components are regulated and controlled to effect substantially complete oxidization of the impurities deposited on the adsorbent but insufficient to effect any substantial oxidization of the permanent surface-active carbon of the adsorbent.

In accordance with an illustrative embodiment of this invention, after the adsorbent has been subjected to the heated oxidizing gases in the manner described, the adsorbent is cooled in a non-oxidizing atmosphere to below a temperature at which the adsorbent will burn in air. That can be accomplished by discharging the adsorbent into a container which is closed to air and cooled therein to the required temperature.

In accordance with the illustrated embodiment of this invention, the spent adsorbent is treated in a number of beds, arranged vertically one above the other. The spent adsorbent is delivered to the top bed where the adsorbent is dried and the dried adsorbent then passes to one or more beds therebelow where the adsorbed deposit is oxidized. In such embodiments, the heated gases enter the bottom of the lower bed or beds and pass successively therethrough and through the top bed. In all beds the gases are maintained at a velocity sufficient to effect fluidization of the spent adsorbent but at an insufficient velocity to carry any material part of the adsorbent out of the bed. In the lower bed or beds, the temperature of the gases and the proportion of the oxidizing components thereof are regulated and controlled to effect substantially complete oxidization of the impurities deposited on the adsorbent but insufficient to effect any substantial oxidization of the permanent surface-active carbon of the adsorbent. The gases passing from the bottom bed or beds to the top bed need not perform any oxidizing function but only a drying function, so that the temperature of the gases passing through the top bed can be comparatively low and they need only be inert chemically. The spent adsorbent from the bottom bed is now flowed to a closed chamber where the adsorbent is cooled to a temperature below that at which the adsorbent will burn in air.

Throughout the process, the conditions are so regulated and controlled that the spent adsorbent is revivified in such a manner so as to remove the deposited impurities, but again in such a manner as to not only leave the permanent surface-active carbon of the adsorbent, but to leave the adsorbent in its coarse granular condition and of a mesh to again be effective for percolation of solutions through a bed thereof.

A fuller understanding of the present invention will be had from the following detailed description when read in conjunction with the accompanying drawings, in which:

Fig. 1 is a flow chart illustrating diagrammatically the revivifying process in accordance with one embodiment of this invention;

Fig. 2 is a side elevation of one form of an apparatus which may be employed for conducting the process of this invention, having some of the parts broken away for purposes of better illustration;

Fig. 3 is a front elevation partly in section of the apparatus of Fig. 2, as viewed from line 3—3 of Fig. 2;

Fig. 7 is a partly sectional view of a cooler element for cooling the revivified adsorbents discharging from the process.

Figure 4:
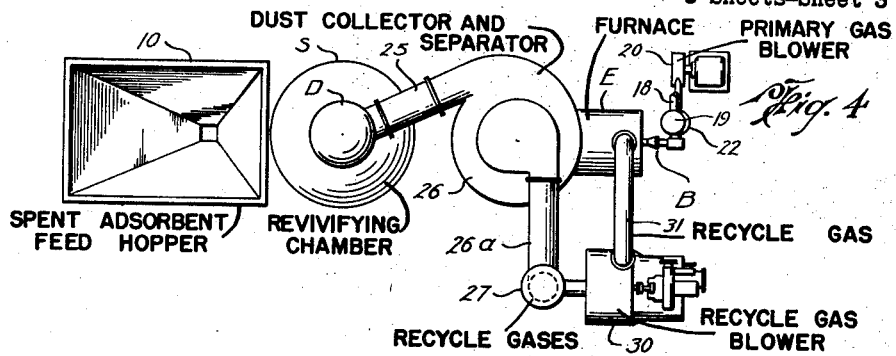
Fig. 4 is a top plan view of the apparatus.

Reference will first be had to Fig. 1 which illustrates in convenient flow diagram form the flow of materials through the revivification procedure and the general arrangement of the apparatus elements. In this embodiment the process will, as an example, be described for the treatment of aqueous solutions of the character produced in the making of sugar from cane, beet and corn, by percolating the aqueous solution through a bed of a coarse granular adsorbent of a type, such as bone char or Synthad, containing surface-active carbon and of a mesh, viz., 10 on 80 mesh, to effect such percolation.

Spent adsorbent, as received from the filtration operation, and containing generally from about 2 to 20 percent of moisture, will be fed by gravity flow from an elevated storage hopper 10 through a conduit 11 under the control of a suitable and generally conventional form of feed valve 12 into the uppermost of one of a series of vertically arranged chambers, numbered 13, 14, and 15 in descending order. The adsorbent particles flow by gravity successively through chambers 13, 14 and 15, accumulate in the chambers in a series of beds 13a, 14a, and 15a, respectively, where the particles are subjected to intimate counter-current contact by a stream of hot revivifying gases which initially enter the lowermost chamber 15 and pass upwardly successively through chambers 15, 14, and 13, having connecting risers 14c and 13c, and wherein the gases serve to fluidize the respective beds while effecting the desired intimate contact with the adsorbent particles in order to accomplish the desired degree of revivification and drying. Downcomers 13b and 14b pass the coarse granular adsorbent successively from chambers 13 and 14 to chambers 14 and 15, respectively. The adsorbent particles leaving lowermost chamber 15, pass downwardly through a downcomer 15b to a suitable cooling chamber 16 where the particles are cooled to a desired temperature in any suitable manner, as by means of indirect heat exchange with a suitable cooling medium, supplied to and discharged from the cooler by connections 16a and 16b, respectively. The cooled and revivified adsorbent particles are discharged from cooler 16 through a line 16c under the control of a vave 16d for further use as a filtering and purifying material.

Revivifying gases are supplied to the system from a furnace or combustion chamber 17 of any suitable and generally conventional design, by burning therein a suitable fuel, such as natural gas, or fuel oil, which is supplied to the furnace through a line 18 under the control of a valve 19, in mixture with fresh air, supplied by means of a blower 20 through a line 21 under the control of a valve 22, at the pressure and volume necessary to effect complete combustion of the fuel and with an amount of excess oxygen which is controlled between narrow limits, depending upon the nature of the adsorbent, the service to which it was put, the temperature and rate of revivification, and other factors such as the amount of air infiltration through leaks in the other parts of the apparatus which will be present in the recycled gases, referred to hereinafter. In order to maintain close and accurate control of the excess oxygen in the gases of combustion, valves 19 and 22 will normally be placed under the control of an air-fuel ratio controller 23, of well-known design, which will be actuated and controlled from the temperature in bed 15a, the connections of the controller being indicated by the broken lines in Fig. 1. With this arrangement it will be evident that the amount of fuel required will be controlled in accordance with the temperature desired to be maintained in bed 15a while the air will always be accurately proportioned to the fuel requirements in accordance with the predetermined excess oxygen requirement for revivification of the adsorbent. It will be understood that other control arrangements of well-known character may be employed to insure accurate control of the excess oxygen in the revivification gases.

The hot gases generated in combustion chamber 17, mixed with recycled gases obtained as will be subsequently described, are delivered through a line 24 into the lower portion of chamber 15 and caused to flow upwardly therethrough and thence successively upwardly through chambers 14 and 13, via risers 14c and 13c, generally counter-current to the downward flow of the adsorbent material through the respective chambers.

The regeneration gases, after passing through bed 13a, at a reduced temperature, discharge from chamber 13 through a line 25 to a conventional dust collector and separator 26 wherein particle fines are separated from the gases and discharged from the system. The gases are vented to a vent line 27 equipped with a control valve 28. A portion of the vent gases may be recycled to the system by means of a line 29 connected to vent line 27 and leading to a turbo-blower 30 which will discharge these recycled gases through a line 31 into a jacketed space 32 surrounding furnace 17, where they first serve to exchange heat with the hot gases of combustion generated in the furnace before being mixed with the combustion gases discharging from the furnace to line 24.

The recycled gases not only serve to control the temperature of the regeneration gases going to the revivification system, but also serve to increase the volume of gases supplied to the revivification system in order to provide the volume and velocity essential to effect the desired degree of fluidization of the beds of adsorbent in the respective chambers, without, at the same time, effecting any appreciable change in the total quantity of oxygen entering the revivification system, since the recycle gases will have been substantially denuded of oxygen by the oxidization reactions taking place in the revivification system.

Each of the chambers 13, 14 and 15 is provided adjacent its lower end with a screened perforated plate 13d, 14d, and 15d, respectively, which serve to support the beds of adsorbent particles and act as distributing orifices for effecting intimate, fluidizing contact with the particles by the revivification gases which are admitted to the respective chambers beneath the respective plates. The velocity and pressure of the gases passing upwardly through the plates serve to effectively fluidize the beds of adsorbent particles which overflow from their upper levels into the upper ends of downcomers 13b, 14b and 15b.

For purposes of this description chamber 13 will be referred to as the drying zone wherein all or the major portion of the moisture initially present in the spent adsorbent will be removed by the gases which have previously passed through chambers 15 and 14, so that the adsorbent particles passing downwardly to the latter chambers will be substantially free of moisture when they enter these chambers. Chambers 14 and 15, together constitute the revivification zone, wherein the dry char particles are subjected to higher temperatures and selective oxidization to remove the organic matter deposited thereon. It will be understood that chambers 14 and 15 may be employed as a single zone. However, for better control of the apparatus and of the revivification process it is generally advantageous to employ a two-stage system as illustrated.

The operating conditions employed in the various portions of the system are substantially as follows:

For service carbons of the bone char type the usual oxygen content of the gases entering the revivification zone should be from 0.5 to 3.5 percent by volume. Higher oxygen concentrations are permissible under some conditions, particularly when processing carbons derived from coal or other bituminous sources, or where it is desirable to also remove some of the permanent carbon. The lower the temperature of revivification, the higher the oxygen concentration may be in the revivification zone.

The revivifying temperature in the revivification zone as a whole will ordinarily be in the range between about 600° F. and 1200° F. Where the revivification zone is divided into two sections, as illustrated, the maximum desired temperature will be maintained in the lowermost zone, such as chamber 15, while a somewhat lower temperature may be maintained in the upper portion of the zone, as in chamber 14. The pressurized mixture of combustion gases and recycled gases should have a temperature sufficient to raise the mass of dried char to the revivifying temperature desired in the revivification zone and this gas temperature will usually range from 100° F. to 350° F. higher than the desired maximum revivification temperature, but this will vary somewhat with the volume of gases used and the other factors previously described.

Gas velocity is a variable. For a given material, there is a rather definite velocity range for satisfactory fluidization. The velocity should be such that turbulence is produced in the bed without lifting particles, of the size it is desired to retain, above the surface of the fluidized mass. Since the weights of new and service chars vary between 30 and 80 pounds per cubic foot, it is obvious that different gas velocities will be required to fluidize beds of different chars to any pre-determined volume. For most adsorbents, however, velocities in the range of 1 to 3 feet per second are preferred, although higher velocities may be required or desirable for heavier particles, older adsorbents or higher throughputs.

With respect to the final temperature of the adsorbent leaving the system, it should be noted that the carbonaceous adsorbent will not be allowed to contact the air until it has cooled below the ignition point of the char in free air. This temperature ranges upward from about 300° F., depending on the type of adsorbent and its previous use record. However, to be on the safe side and also to provide char cooled sufficiently to again contact carbohydrate solutions, the cooling is preferably carried to a maximum temperature of about 200° F., so that it will not be above about 160° F. to 180° F. when it again contacts liquors or syrups in a subsequent char cycle.

It will be understood that numerous variations may be made in the procedure described above. For example flue gas from a boiler or other fuel burning equipment may be used as a source of hot fluidizing gases and may be introduced into the system as by means of line 33. Or if the flue gas contains too much free oxygen, such flue gas may be used to burn additional fuel in the combustion chamber to reduce the oxygen content to within the desired limits. Low pressure steam, introduced as by means of line 34, may be superheated and used with measured quantities of air, or the composition of the revivifying gases may be regulated so as to contain no free oxygen, and small quantities of air may be introduced into the revivification zone of the apparatus, as by means of line 35 and blower 36 under the control of a meter 37.

If desired some of the hot gases from line 24 may be introduced at other points along the revivifying zone, as by means of a line 38 having branch lines 39 and 40, fitted with control valves 41 and 42, respectively, which connect into risers 14c and 13c, respectively.

Figure 5:
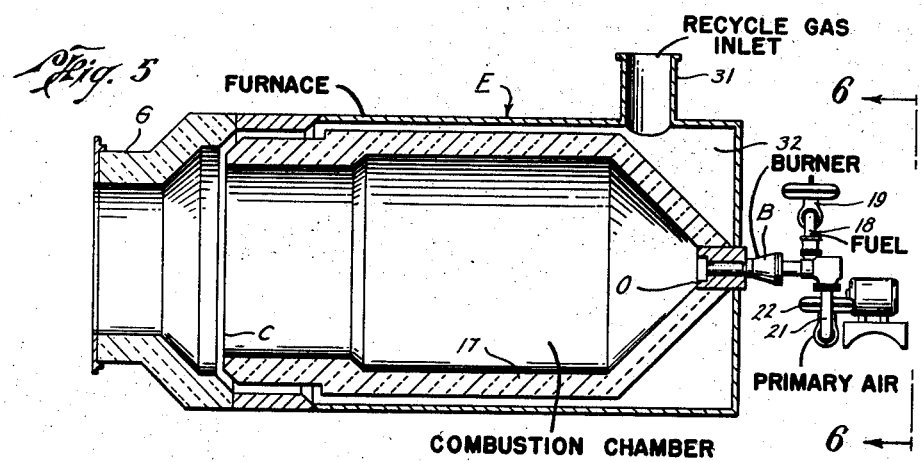
Fig. 5 is a longitudinal sectional view of a form of combustion chamber for supplying revivifying gases.
Figure 6:
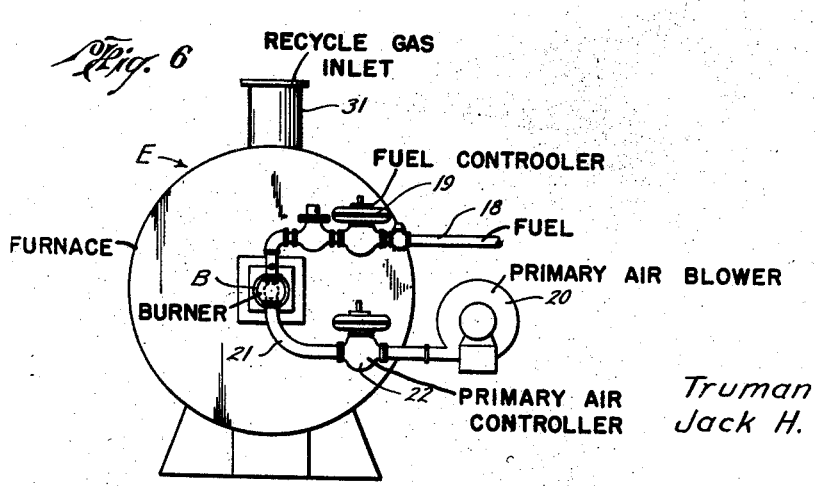
Fig. 6 is a front end elevation of the combustion chamber viewed from line 6—6 of Fig. 5.

Figs. 2 to 7, inclusive, illustrate one specific form of apparatus which may be successfully employed for practicing the char revivification process in accordance with this invention. Wherever convenient, the parts of the apparatus bear the same numbers as those employed on the corresponding parts of Fig. 1.

In this apparatus it will be seen that chambers 13, 14 and 15 are all embodied in a single, vertically disposed tubular vessel S, wherein perforated plates 13d, 14d, and 15d serve to separate the chambers and support the respective char beds 13a, 14a and 15a. The perforations in the plates provide the means to admit the hot revivification gases into contact with the respective beds of char and correspond generally in function to risers 13c and 14c of Fig. 1. A downcomer 13b extends between a point just beneath the upper surface of bed 13a to beneath the surface of bed 14a, and a second downcomer 14b similarly connects bed 14a to bed 15a. These downcomers are preferably arranged exteriorly of vessel S with only the ends thereof extending through the wall of the vessel to the proper points relative to the interconnected beds.

The upper end of vessel S is provided with a dome D communicating with chamber 13 and connected to a pipe 25 leading to dust collector and separator 26, which is of the conventional cyclone type, wherein fines from the char carried over by the gases leaving vessel S are separated from the gases and discharged from the system through the lower end of separator 26. The gases are discharged from the upper end of the separator through a pipe 26a to a stack 27 having a damper 28 therein above the point of connection of pipe 26a to stack 27. The lower end of stack 27 is connected by means of a pipe 29 to the suction of turbo-blower 30 which has the discharge pipe 31 connected to the furnace, designated generally by the letter E, which supplies the hot revivification gases to the revivification system. Furnace E may be of any generally conventional type. In the form illustrated in Figs. 5 and 6, it consists of the tubular combustion chamber 17, provided with a burner opening O at one end and a discharge opening C at the opposite end. A burner B of generally conventional design extends into burner opening O. A shell of the furnace E surrounds combustion chamber 17 providing the annular space 32 surrounding the combustion chamber. The end of shell is closed at the burner end of the furnace, being sealed about the burner opening, and at the opposite end communicates with a duct G registering with discharge opening C of the combustion chamber. Pipe 31 communicates with annular space 32, preferably at a point adjacent the burner end of the furnace, so that the recycle gases introduced in space 32 from pipe 31 will be forced to travel around the exterior of combustion chamber 17 and along its length before entering duct G where the recycle gases will mix with the hot combustion gases discharging from the combustion chamber through discharge opening C. With the closure thus formed by the sheet around the combustion chamber it will be seen that the only inlet for free air is through burner B, thereby limiting the quantity of oxygen entering the system to that introduced through burner B. Fuel pipe 18 is connected to burner B and provided with a suitable regulating valve 19. Pipe 21 is also connected to burner B and communicates with the discharge of air blower 20 for supplying primary combustion air to burner B. Regulating valve 22 is installed in pipe 21. It will be understood that regulating valves 19 and 22 will be under the control of a conventional fuel-air ratio controller, such as indicated at 23 in Fig. 1, for controlling the ratio of air to fuel going to burner B so as to closely regulate the proportion of excess oxygen in the combustion gases generated in the combustion chamber. Duct G is connected by means of conduit 24, having a conventional blast gate 24a installed therein, to the lower end of vessel S below plate 15d at the bottom of chamber 15. The by-pass pipe 38 connects to conduit 24 ahead of blast gate 24a and has a blast gate 38a installed therein. Branch pipes 39 and 40, fitted with respective blast gates 41 and 42, lead from by-pass pipe 38 into chambers 15 and 14, respectively.

Storage hopper 10 is shown in elevated position relative to chamber 13 in vessel S and discharges through pipe 11 which extends through the side of vessel S to a point below the upper surface of bed 13a. The feeder valve 12 is mounted in pipe 11 and may be of any suitable design adapted to regulate the rate of introduction of spent char into chamber 13. Generally, however, feeder valve 12 will be of the conventional vibratory type in order to break up any clumps of spent char particles before the latter enter chamber 13.

Pipe 15b extends through the side of vessel S into chamber 15 terminating at a point therein near the upper surface of bed 15a. The outer end of pipe 15b connects to the upper end of a vertical cooler 16 (see Fig. 7). Cooler 16 is composed of a tubular shell 45 fitted interiorly adjacent its opposite ends with tube sheets 46 and 47 which are provided with a plurality of registering outwardly flaring openings 48—48 connected by tubes 49. The reactivated char, entering shell 45 through the upper nozzle 50, will fall by gravity from the space above tube sheet 46 through tubes 49 to the space below tube sheet 47 from which the char will pass through a discharge nozzle 51 which is fitted with a suitable and generally conventional type of air-excluding gate 52. Inlet and outlet connections 16a and 16b connect into shell 45 between the tube sheets for circulation of a suitable cooling medium, such as water, in indirect contact with the char passing through tubes 48. A thermometer well 53 is provided in nozzle 51 for measuring the temperature of the char discharging from cooler 16.

The operation of the apparatus illustrated in Figs. 2 to 7 is substantially the same as that described in connection with Fig. 1.

It will be understood that the drying step performed in chamber 13 may be accomplished in other apparatus and the char subsequently introduced into the fluidizing apparatus for regeneration. However, this will ordinarily not be advantageous from the standpoint of heat economy and continuity of process and the arrangements described will ordinarily be preferred.

A feature of our process as herein disclosed is the selective oxidization of adsorbed organic impurities from the faces of the adsorbent when the latter is in direct contact in the fluidized state with heated gases in which the free oxygen is rigidly controlled, and the adsorbent is subjected to the weaker oxidizing action of gases such as carbon dioxide or superheated steam.

From the foregoing description it is apparent that the present invention accomplishes its objects, i. e., to provide a simple, low cost system which provides a degree of revivification efficiency and control which has not been attainable in either retort kilns or rotary decarbonizers such as have been long used in the sugar and corn products industries. This process is of importance where there should be selective oxidization of adsorbed organic impurities without substantial loss of the activated carbon deposited within the structure of the adsorbent, and where deposits of inactive carbon derived from pyrolysis of the adsorbed organic impurities must be avoided because sufficient oxygen and high enough temperatures cannot be used to burn them out without injuring or even destroying the adsorbent.

In the illustrative embodiment, by subjecting the spent adsorbent in the fluidized state to the initial drying step, followed by revivification in direct contact with controlled atmospheres wherein it is possible to regulate with sufficient degrees of accuracy the time of contact, temperature of revivification, and the oxygen concentration so that removal of moisture and adsorbed organic impurities, inclusive of any residual carbohydrate materials, is accomplished evenly and within a relatively short time in comparison with existing practices; and with little or no pyrolysis or cracking under conditions which form tarry residues which ultimately leave inactive, graphitic carbon deposits within the porous structure of the adsorbent. This is accomplished by burning off the adsorbed organic matter at the original site of adsorption at a temperature level which leaves the permanent carbon originally present on the adsorbent substantially unaffected during the short time period involved.

This process offers several outstanding advantages over the use of retort kilns or rotary kiln apparatus. These are:

(1) Low cost of equipment.
(2) Compactness.
(3) Excellent heat transfer from gas to solid.
(4) Capacity for close control of temperature levels.
(5) Cleanliness inherent in totally enclosed construction.
(6) Particle sizing effect, with ready removal of fines.
(7) Good heat economy.

Of importance is the selection of a suitable gas for fluidizing and heating the bed. Practical considerations limit the choice to low pressure superheated steam or combustion gas obtained from a high grade fuel, such as natural gas. Superheated steam has several advantages: (a) sugar refineries have abundant low pressure steam; (b) it is readily furnished at any desired pressure; (c) it is inert and essentially non-corrosive; (d) very simple equipment is needed for superheating; (e) the specific heat of water vapor is high. However, all heat transfer in the beds would have to involve sensible heat only, and the high latent heat would be wasted. It is unlikely that the cooled steam could be used elsewhere, since entrained dust would foul heat transfer surfaces and contaminate condensate. Combustion gases give better heat economy but require compression and recirculation. Careful burner control is important to limit free oxygen.

For practical purposes, the frictional losses through a bed of adsorbent may be neglected, and the total pressure drop of gas as it passes through the bed may be calculated from the force required to keep the bed suspended. Thus, the fluidized bed may be regarded as a liquid, and the pressure drop of the gas taken as equal to the static pressure produced. The effective density of the fluidized bed is dependent upon the gas velocity. At low velocities, the volume of voids is low, and the bed density is high. With increased velocity, the bed expands, the volume of voids increases, and the bed density decreases. As an approximation, the static head may be taken as that due to the weight of the material in a fixed bed. Upon being fluidized, the density decreases, but there is a corresponding increase in depth, due to expansion. Thus, if the bulk density of a service char is taken at 62.3 lb. per cu. ft., the pressure drop is approximately equal to inches of fixed bed depth, expressed as inches of water pressure. Each foot of bed would result in a pressure drop of 12 inches of water pressure, or 0.43 lb. per sq. in.

For multiple beds arranged for series gas flow, the pressure drops through the beds are additive. Also, there would be losses due to friction in other parts of the system. Thus, a large unit will require an initial gas pressure of several pounds per sq. in.

In accordance with the illustrated process embodying this invention, the criterion is not simply the temperature at which the gases are passed through a bed of the granular adsorbent, but of the regulation and control of the proportion of the oxidizing components in the gases to effect substantially complete oxidization of the impurities deposited on the adsorbent, but insufficient to effect any substantial oxidization of the permanent surface-active carbon of the adsorbent. Unless there is such control, then regardless of temperature, within limits, the permanent surface-active carbon will be oxidized and burned up, that is, destroyed.

As previously noted, in accordance with the illustrated embodiment of this invention, the coarse granular adsorbent is one of a type containing permanent surface-active carbon, but of a mesh to effect subsequent percolation of solutions through a bed of the granular adsorbent and, as an example, that mesh is through 10 on 80, that is, through a 10 mesh and retained on an 80 mesh of a Tyler screen. In that respect the granular adsorbent distinguishes from a material which is pulverized rather than granular, viz., pulverized to a mesh of through 100 on 400, that is, through a 100 mesh and retained on a 400 mesh Tyler screen, resulting in a powder. Such powdered material, even though of activated charcoal, is not of practical utility in a process of treating solutions by percolating the same through a bed of the material. Such powdered materials are generally used as catalysts for contact with a liquid such as an oil charge, followed by filtering and washing. In the process of revivifying such powdered material, it is not of importance that a particular mesh size range be retained, nor is it of importance that there be no oxidization at all of the adsorbent. In fact, in processes employing such powdered materials, for instance, as catalysts in cracking processes, the deposit is highly resistant to oxidization so that the oxidizing treatment must be rather drastic. In such a case, oxidization of the mineral structure of the catalysts may be even necessary to restore some catalysts to their active metallic oxide status, or to return spent alumino-silicate catalysts to their highest activity, although it may not be advisable to burn off an original activated carbon, even if it is of fine mesh size (powdered), since that would represent a loss. While a powdered catalyst may be an adsorbent in the sense that it is a porous structure which exposes large, surface areas, in cracking catalysts, the material is definitely of fine mesh, 100 on 400, i. e., powdered as distinguished from coarse mesh, i. e., granular. In accordance with our process embodying this invention, however, in which the deposit on the adsorbent is readily oxidizable, the oxidization is carried out in such a manner as to simply free the adsorbent from that sensitive deposit, without any substantial oxidization of the permanent surface-active carbon of the granular adsorbent and without materially changing its coarse granular structure.

An example of the process embodying a drying bed and three superimposed revivifying beds is as follows: An adsorbent suitable for the treatment of sugar solutions is a bone char of a mesh passing through a standard (Tyler) 10 mesh classifying screen, but which will be retained on an 80 mesh screen, having a bulk density of 62.3 lbs. per cu. ft. and having after use in the treatment of sugar solutions a moisture content of 2 to 20%, depending upon the extent of drainage after treatment of the solution. The fluidizing gas is natural gas with air for combustion and oxidizing and containing 0.5 to 3.5% of oxygen by volume of the total natural gas and air supplied to the revivification zone, which oxygen percentage will decrease from the maximum entering the bottom revivifying bed to the minimum at the top of the upper revivifying bed as the oxygen is consumed by the char or adsorbent. The temperature of the gas supplied to the beds in the revivifying zone will be about 1200° F. as entering the bottom bed, decreasing to a somewhat lower temperature in the top bed. The gases from the top bed of the revivifying zone and passing through the bed in the drying zone will have their temperature further reduced in the evaporation of the moisture and volatile matter of the adsorbent. The velocity of the gases applied to the beds is from 1 to 3 ft. per second and each foot of the char bed will result in a pressure drop of 0.43 lb. per sq. in. The velocity is sufficient to fluidize the granulated char without lifting the coarse granules while any fine particles will pass to the dust collector. The temperature of the gases and the proportion of oxygen is sufficient to effect substantially complete oxidation of the impurities which have been deposited on the char, but insufficient to effect any substantial oxidation of the permanent surface-active carbon of the char. The cooling of the charge leaving the bottom bed of the revivifying zone is carried out in the air-tight cooler to about 200° F. which is well below the ignition of the char in air, so that when the char is discharged from the cooler its temperature will drop to about 160°–180° F. when it is again used to contact the sugar solution for treatment of the same.

While in the foregoing disclosure of the present invention reference has been made to various specific temperatures, gas rates, gas analyses, pressures, etc., and to an apparatus exemplifying one form of assembly suitable for practicing our invention, it is to be distinctly understood that such modifications and the use of such individual features and subcombinations of features as present themselves to those skilled in the art without departing from the spirit of this invention are, although not specifically described herein, contemplated by and within the scope of the appended claims.

Having thus described the invention, what is claimed and desired to be secured by Letters Patent is:

1. In the art of treating aqueous solutions of the character produced in the making of sugar from cane, beet and corn and containing coloring matter, salts and other impurities in association with sucrose, dextrose, levulose, maltose, dextrins and other soluble matter, by percolating the aqueous solution through a bed of a coarse granular adsorbent of a type containing permanent surface-active carbons and of a mesh to effect such percolation, a process for revivifying such coarse granular spent adsorbent containing an adsorbed deposit of such impurities, comprising, passing heated oxidizing gases through a loose bed of such coarse granular spent adsorbent at a velocity sufficient to effect fluidization thereof thus decreasing the bulk density of the bed and expanding the depth thereof, but at an insufficient velocity to carry any material part of such adsorbent out of the bed, and regulating the temperature of and the proportion of the oxidizing components in the gases to effect substantially complete oxidation of the impurities deposited on such adsorbent but insufficient to effect any substantial oxidation of the permanent surface-active carbon of such adsorbent.

2. In the art of treating aqueous solutions of the character produced in the making of sugar from cane, beet and corn and containing coloring matter, salts and other impurities in association with sucrose, dextrose, levulose, maltose, dextrins and other soluble matter, by percolating the aqueous solution through a bed of a coarse granular adsorbent of a type containing permanent surface-active carbon and of a mesh to effect such percolation, a process for revivifying such coarse granular spent adsorbent containing an adsorbed deposit of such impurities, comprising, passing heated oxidizing gases through a loose bed of such coarse granular spent adsorbent at a velocity sufficient to effect fluidization thereof thus decreasing the bulk density of the bed and expanding the depth thereof, but at an insufficient velocity to carry any material part of such adsorbent out of the bed, regulating the temperature of and the proportion of the oxidizing components in the gases to effect substantially complete oxidization of the impurities deposited on such adsorbent but insufficient to effect any substantial oxidation of the permanent surface-active carbon of such adsorbent, and cooling the so treated adsorbent in a non-oxidizing atmosphere to a temperature below that at which such adsorbent will burn in air.

3. In the art of treating aqueous solutions of the character produced in the making of sugar from cane, beet and corn and containing coloring matter, salts and other impurities in association with sucrose, dextrose, levulose, maltose, dextrins and other soluble matter, by percolating the aqueous solution through a bed of a coarse granular adsorbent of a type containing permanent surface-active carbon and of a mesh to effect such percolation, a process for revivifying such coarse granular spent adsorbent containing an adsorbed deposit of such impurities, comprising, passing heated gases through a loose bed of such coarse granular spent adsorbent at a velocity sufficient to effect fluidization thereof thus decreasing the bulk density of the bed and expanding the depth thereof, and at a temperature to volatilize the water therein, then passing heated oxidizing gases through such loose bed at a velocity sufficient to effect such fluidization thereof but at an insufficient velocity to carry any material part of such adsorbent out of the bed, and regulating the temperature of and the proportion of the oxidizing components in the gases to effect substantially complete oxidization of the impurities deposited on such adsorbent but insufficient to effect any substantial oxidization of the permanent surface-active carbon of such adsorbent.

4. In the art of treating aqueous solutions of the character produced in the making of sugar from cane, beet and corn and containing coloring matter, salts and other impurities in association with sucrose, dextrose, levulose, maltose, dextrins and other soluble matter, by percolating the aqueous solution through a bed of a coarse granular adsorbent of a type containing permanent surface-active carbon and of a mesh to effect such percolation, a process for revivifying such coarse granular spent adsorbent containing an adsorbed deposit of such impurities, comprising, passing heated gases through a loose bed of such coarse granular spent adsorbent at a velocity sufficient to effect fluidization thereof thus decreasing the bulk density of the bed and expanding the depth thereof, and at a temperature to volatilize the water therein, then passing heated oxidizing gases through such a loose bed at a velocity sufficient to effect such fluidization thereof but at an insufficient velocity to carry any material part of such adsorbent out of the bed, regulating the temperature of and the proportion of the oxidizing components in the gases to effect substantially complete oxidization of the impurities deposited on such adsorbent but insufficient to effect any substantial oxidation of the permanent surface-active carbon of such adsorbent, and cooling the so treated adsorbent in a non-oxidizing atmosphere to a temperature below that at which such adsorbent will burn in air.

5. In the art of treating solutions of the character described containing readily oxidizable matter, by percolating the solution through a bed of coarse granular bone char of a mesh to effect such percolation, a process for revivifying such coarse spent char containing an adsorbed deposit of such matter, comprising, passing heated oxidizing gases through a loose bed of such coarse granular spent char at a velocity sufficient to effect fluidization thereof thus decreasing the bulk density of the bed and expanding the depth thereof, but at an insufficient velocity to carry any material part of such char out of the bed, and regulating the temperature of and the proportion of the oxidizing components in the gases to effect substantially complete oxidization of the matter deposited on the char but insufficient to effect any substantial oxidization of the char.

6. In the art of treating solutions of the character described containing readily oxidizable matter, by percolating the solution through a bed of a coarse granular adsorbent of a type containing permanent surface-active carbon and of a mesh to effect such percolation, a process for revivifying such coarse spent adsorbent containing an adsorbed deposit of such matter, comprising, passing heated oxidizing gases through a loose bed of such coarse granular spent adsorbent at a velocity sufficient to effect fluidization thereof thus decreasing the bulk density of the bed and expanding the depth thereof, but at an insufficient velocity to carry any material part of such adsorbent out of the bed, and regulating the temperature of and the proportion of the oxidizing components in the gases to effect substantially complete oxidization of the matter deposited on such adsorbent but insufficient to effect any substantial oxidization of the permanent surface-active carbon of such adsorbent.

7. The process of revivifying a spent coarse granular adsorbent containing permanent surface-active carbon and of a mesh to permit percolation of a liquid through a bed thereof, such adsorbent having an adsorbed deposit of readily oxidizable matter, comprising, passing heated oxidizing gases through a loose bed of such coarse granular spent adsorbent at a velocity sufficient to effect fluidization thereof thus decreasing the bulk density of the bed and expanding the depth thereof, but at an insufficient velocity to carry any material part of such adsorbent out of the bed, and regulating the temperature of and the proportion of the oxidizing components in the gases to effect substantially complete oxidization of the matter deposited on such adsorbent but insufficient to effect any substantial oxidization of the permanent surface-active carbon of such adsorbent.

8. The process of revivifying spent coarse granular carbon containing permanent surface-active carbon and having an adsorbed deposit thereon, comprising, passing heated oxidizing gases through a loose bed of such coarse granular spent adsorbent at a velocity sufficient to effect fluidization thereof thus decreasing the bulk density of the bed and expanding the depth thereof, but at an insufficient velocity to carry any material part of such adsorbent out of the bed, regulating the temperature of and the proportion of the oxidizing components in the gases to effect substantially complete oxidization of the matter deposited on such adsorbent but insufficient to effect any substantial oxidization of the permanent surface-active carbon on such adsorbent, and cooling the so treated adsorbent in a non-oxidizing atmosphere to a temperature below that at which such adsorbent will burn in air.

9. The process of revivifying spent coarse granular carbon containing permanent surface-active carbon, having an adsorbed deposit thereon, and containing volatile matter, comprising, passing heated gases through a loose bed of such coarse granular spent adsorbent at a velocity sufficient to effect fluidization thereof thus decreasing the bulk density of the bed and expanding the depth thereof and at a temperature to volatilize the volatile matter, then passing heated oxidizing gases through a loose bed of such spent adsorbent at a velocity sufficient to effect such fluidization thereof but at an insufficient velocity to carry any material part of such adsorbent out of the bed, and regulating the temperature of and the proportion of the oxidizing components in the gases to effect substantially complete oxidization of the matter deposited on such adsorbent but insufficient to effect any substantial oxidization of the permanent surface-active carbon of such adsorbent.

10. The process of revivifying spent coarse granular carbon containing permanent surface-active carbon, having an adsorbed deposit thereon, and containing volatile matter, comprising, passing heated gases through a loose bed of such coarse granular spent adsorbent at a velocity sufficient to effect fluidization thereof thus decreasing the bulk density of the bed and expanding the depth thereof and at a temperature to volatilize the volatile matter, then passing heated oxidizing gases through a loose bed of such spent adsorbent at a velocity sufficient to effect such fluidization thereof but at an insufficient velocity to carry any material part of such adsorbent out of the bed, regulating the temperature of and the proportion of the oxidizing components in the gases to effect substantially complete oxidization of the matter deposited on such adsorbent but insufficient to effect any substantial oxidization of the permanent surface-active carbon of such adsorbent, and cooling the so treated adsorbent in a non-oxidizing atmosphere to a temperature below that at which such adsorbent will burn in air.

References Cited in the file of this patent

UNITED STATES PATENTS

| | | |
|---|---|---|
| 2,388,035 | Hemminger | Oct. 30, 1945 |
| 2,571,380 | Penick | Oct. 16, 1951 |
| 2,616,858 | Gillette et al. | Nov. 4, 1952 |